(12) United States Patent
Kim et al.

(10) Patent No.: US 8,958,012 B2
(45) Date of Patent: Feb. 17, 2015

(54) APPARATUS FOR PROCESSING MOVING IMAGE ANCILLARY INFORMATION BASED ON A SCRIPT AND METHOD THEREOF

(75) Inventors: Joo-Hyun Kim, Anyang-si (KR);
Joon-Ho Cho, Suwon-si (KR);
Yoon-Soo Kim, Suwon-si (KR);
Jeong-Ja Kim, Suwon-si (KR);
Sung-Jae Shin, Hwaseong-si (KR);
In-Hwan Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1040 days.

(21) Appl. No.: 12/334,793

(22) Filed: Dec. 15, 2008

(65) Prior Publication Data

US 2009/0180023 A1     Jul. 16, 2009

(30) Foreign Application Priority Data

Jan. 14, 2008 (KR) .................. 10-2008-0004023

(51) Int. Cl.
*H04N 11/00* (2006.01)
*H04N 7/24* (2011.01)
*H04N 21/236* (2011.01)
*H04N 21/434* (2011.01)

(52) U.S. Cl.
CPC .......... *H04N 7/24* (2013.01); *H04N 21/23614* (2013.01); *H04N 21/4348* (2013.01)
USPC ............................. 348/468; 348/465; 348/564

(58) Field of Classification Search
USPC ......... 348/468, 460–461, 465, 473, 553–555, 348/563–564, 565, 569; 386/126, 95, 83, 386/46, 125; 725/44–47, 51–52, 112–113
IPC ........................................................ H04N 11/00
See application file for complete search history.

(56) References Cited

U.S. PATENT DOCUMENTS

| 6,581,051 | B1 * | 6/2003 | Ueno et al. ............... 706/47 |
| 7,555,207 | B2 * | 6/2009 | Kang et al. .............. 386/244 |
| 7,697,068 | B2 * | 4/2010 | Aratani et al. ........... 348/553 |
| 2004/0068547 | A1 * | 4/2004 | Kang ....................... 709/206 |

(Continued)

FOREIGN PATENT DOCUMENTS

| JP | 2003-037807 A | 2/2003 |
| JP | 2005-025413 A | 1/2005 |

(Continued)

OTHER PUBLICATIONS

Communication dated Jan. 24, 2014 from the Korean Intellectual Property Office in a counterpart Korean application No. 10-2008-0004023.

(Continued)

*Primary Examiner* — Trang U Tran
(74) *Attorney, Agent, or Firm* — Sughrue Mion, PLLC

(57) ABSTRACT

A method and apparatus for processing moving image ancillary information, based on a script, is provided. The method includes receiving a user command for inputting ancillary information, where the ancillary information includes a script for a moving image being played. The method further includes storing the ancillary information input by a user, searching for and extracting the stored ancillary information during playback of the moving image, and outputting the extracted ancillary information to an image display screen using the script.

14 Claims, 9 Drawing Sheets

(56) References Cited

U.S. PATENT DOCUMENTS

2005/0180462 A1* 8/2005 Yi .................................. 370/487
2010/0266265 A1* 10/2010 Jung et al. .................... 386/126

FOREIGN PATENT DOCUMENTS

| KR | 10-2002-0065250 A | 8/2002 |
| KR | 10-2004-0034403 A | 4/2004 |
| KR | 1020060007974 A | 1/2006 |
| KR | 10-2006-0016135 A | 2/2006 |
| KR | 10-2007-0059572 A | 6/2007 |

OTHER PUBLICATIONS

Communication, dated Jul. 23, 2014, issued by the KIPO in counterpart Korean Patent Application No. 10-2008-0004023.

* cited by examiner

FIG. 6

```
<SAMI>
<HEAD>
<Title>Subtitle file created with Subtile Converter V2.0</Title>
<STYLE TYPE="text/CSS">
<!--
P{margin-left:8pt;   margin-right:8pt;   margin-bottom:2pt;
margin-top:2pt;
Text-align:center; font-size:20pt; font-family:arial, sans-serif;
Font-weight:normal; color:white;}
.EGCC {Name:English; lang:en-EN; SAMIType:CC;}
#STDPrn {Name:Standard Print;}
#LargePrn {Name:Large Print; font-size:20pt;}
#SmallPrn {Name:Small Print; font-size:10pt;}
.STAR_DIAGRAM  {background="star.gif",text-align:center;font-
size:100pt;width=50pt;Height=100pt}
-->
</STYLE>
</HEAD>
<BODY>
<SYNC Start=38838 duration=10s>
<P Class=EGCC background="BackGround.gif" Width="100pt"
Height="50pt"   left="60%"   top="30%"   alpha="60%"
userid="createmain@hotmail.com">
<center>"Hands up!"</center>
<P   Class=STAR_DIAGRAM   align="center"   top="30pt"
left="40pt" alpha="70%">!
<SYNC Start=40533><P Class=EGCC> 
<SYNC Start=40673><P Class=EGCC>
"December 23, 10:58 a.m. <br>
Finished?"
<SYNC Start=43198><P Class=EGCC> 
<SYNC Start=46179><P Class=EGCC>
"Yes"<br>
<SYNC Start=48579><P Class=EGCC> 
<SYNC Start=54587><P Class=EGCC>
"December 23, 10:58 a.m. <br>
How are you getting home?"
</BODY>
</SAMI>
```

APPARATUS FOR PROCESSING MOVING IMAGE ANCILLARY INFORMATION BASED ON A SCRIPT AND METHOD THEREOF

CROSS-REFERENCE TO RELATED APPLICATION

This application is based on and claims priority from Korean Patent Application No 10-2008-0004023, filed on Jan. 14, 2008, in the Korean Intellectual Property Office, the disclosure of which is incorporated herein in its entirety by reference.

BACKGROUND OF THE INVENTION

1. Field of the Invention

Apparatuses and methods consistent with the present invention related to processing moving image ancillary information, and, more particularly, to processing moving image ancillary information based on a script and displaying diverse ancillary information, based on a script, on a moving image display screen.

2. Description of the Related Art

In related art, as illustrated in FIG. 1, a moving image caption display screen is provided to a user in a state where caption information is separated from a moving image during playback of the moving image.

In a related art moving-image-caption-processing method, a caption file and an image file are processed separately. In this case, the image file is divided into image information and sound information. The sound information is decoded in a form that can be output through a sound device such as a speaker, and the image information is decoded in a form that can be output through an image display device. At this time, the caption file is converted into an image format, and this converted caption image is synthesized with the image information to be output to the screen.

In addition, a user opinion display applied to a conventional moving image caption processing apparatus is performed using image identification (ID) information in order to define a relationship between the image information and the user opinion display. The image ID information may be given in a specified format, or may be hash information of the moving image. If a user inputs an opinion, the image ID information and the user opinion information are stored in a database together. The information as stored above is displayed on the screen when moving image information is observed, and is stored in the database. The image ID information and the user opinion information are basic information for image storage and loading, and various additional kinds of information may be stored in the database.

However, in the related art moving-image-caption-processing method, the user opinion information is displayed in a fixed position and format, and thus it is difficult to properly reflect various states of a moving image or music in a temporal manner.

In addition, since the user opinion information depends on the database, it is impossible for the user to designate the caption display position, form, and so forth. That is, the user cannot add, change, or delete the image-related opinion being displayed in a specified position and shape at a specified time. In particular, the moving image caption is displayed in the same position, and this causes the user inconvenience in reading the caption or in understanding the image being displayed.

SUMMARY OF THE INVENTION

An object of exemplary embodiments of the present invention is to provide an apparatus for processing moving image ancillary information based on a script and a method thereof, which can generate and display the script including the shape and changed state of ancillary information in the course of time for which a moving image is played.

Additional advantages, objects, and features of exemplary embodiments of the invention will be set forth in part in the description which follows and in part will become apparent to those having ordinary skill in the art upon examination of the following or may be learned from practice of the invention.

According to an exemplary embodiment, there is provided an apparatus for processing moving image ancillary information based on a script. The apparatus includes an input unit which receives a user command for inputting ancillary information, the ancillary information including the script to a moving image being played; a storage unit which stores the ancillary information inputted to the input unit; an extraction unit which searches for and extracts the ancillary information stored in the storage unit during playback of the moving image; and an output unit which outputs the ancillary information extracted by the extraction unit to a corresponding image display screen based on the script.

According to another exemplary embodiment, there is provided a method of processing moving image ancillary information based on a script. The method includes: receiving a user command for inputting ancillary information, the ancillary information including the script to a moving image being played; storing the ancillary information input by a user; searching for and extracting the stored ancillary information during playback of the moving image; and outputting the extracted ancillary information to a corresponding image display screen based on the script.

BRIEF DESCRIPTION OF THE DRAWINGS

The above and other exemplary aspects of the present invention will be apparent from the following detailed description of exemplary embodiments taken in conjunction with the accompanying drawings, in which:

FIG. 6 is a view illustrating an ancillary information script applied to an apparatus for processing moving image ancillary information according to an exemplary embodiment of the present invention;

DETAILED DESCRIPTION OF EXEMPLARY EMBODIMENTS OF THE INVENTION

Figure 1:
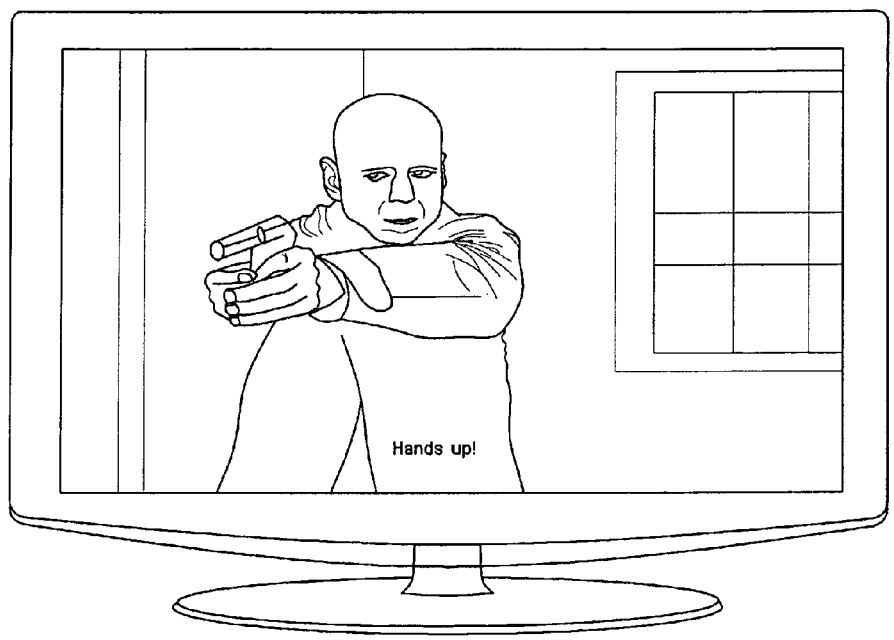
FIG. 1 is an exemplary view illustrating a related art moving image caption display screen.

Hereinafter, exemplary embodiments of the present invention will be described in detail with reference to the accompanying drawings. The aspects and features of the present invention and methods for achieving the aspects and features will be apparent by referring to the exemplary embodiments to be described in detail with reference to the accompanying drawings. However, the present invention is not limited to the embodiments disclosed hereinafter, but can be implemented in diverse forms. The matters defined in the description, such as the detailed construction and elements, are merely provided to assist those of ordinary skill in the art in a comprehensive understanding of the invention, and the present invention is only defined within the scope of the appended claims. In the description of the present invention, the same drawing reference numerals are used for the same elements across various figures.

An apparatus for processing moving image ancillary information based on a script and a method thereof according to exemplary embodiments of the present invention will be described with reference to the accompanying drawings. For reference, in the following description, well-known processes, configurations, and technologies are not described in detail since the additional description would obscure the invention.

Figure 2:
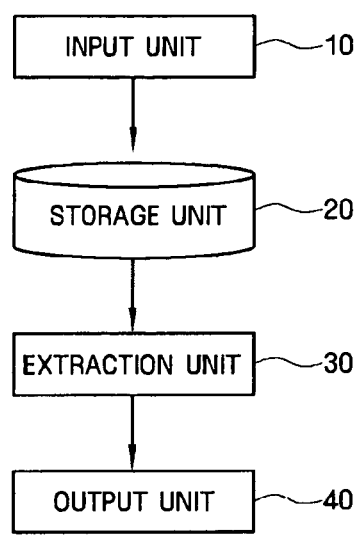
FIG. 2 is a block diagram illustrating the configuration of an apparatus for processing moving image ancillary information based on a script according to an exemplary embodiment of the present invention.
Figure 3:
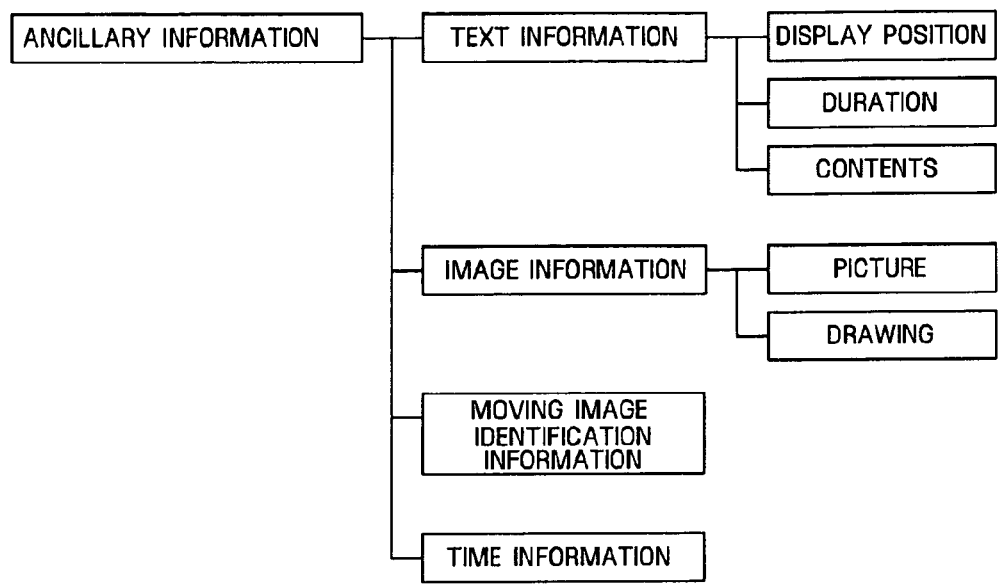
FIG. 3 is a view illustrating the configuration of an ancillary information script applied to an apparatus for processing moving image ancillary information according to an exemplary embodiment of the present invention.
Figure 4:
FIG. 4 is a view illustrating an ancillary information script output screen in an apparatus for processing moving image ancillary information according to an exemplary embodiment of the present invention.
Figure 5:
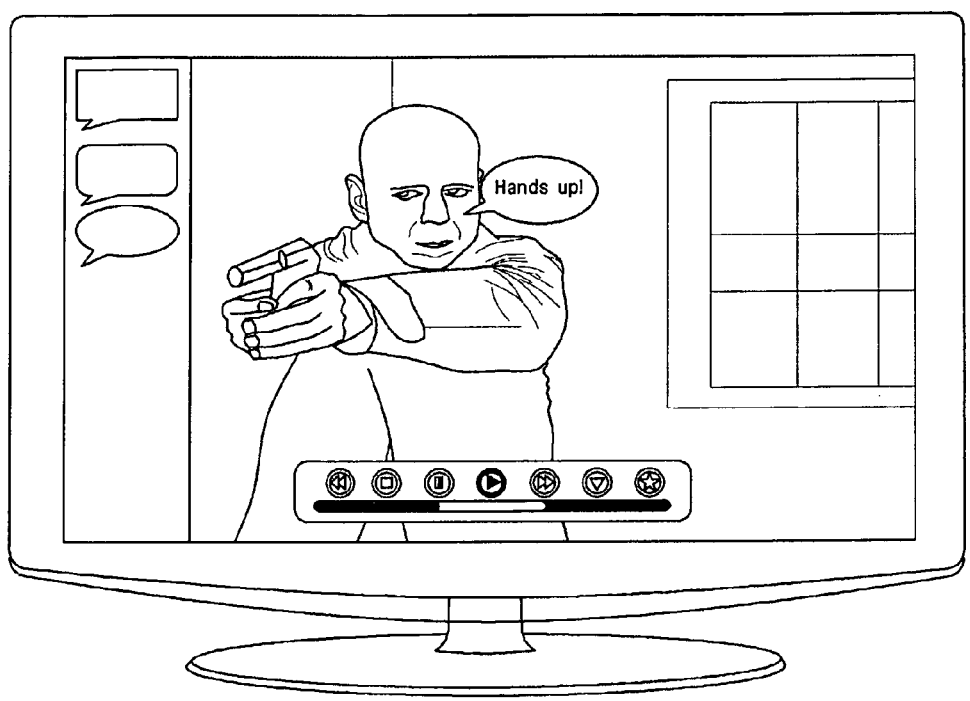
FIG. 5 is a view illustrating an ancillary information script input screen in an apparatus for processing moving image ancillary information according to an exemplary embodiment of the present invention.
Figure 7:
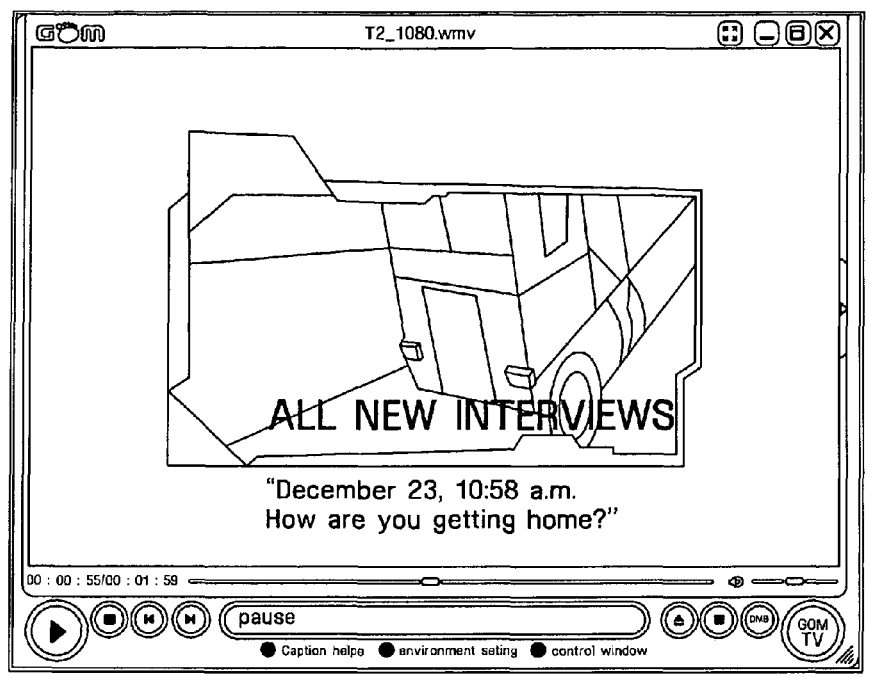
FIG. 7 is a view illustrating applying an apparatus for processing moving image ancillary information to a general moving image playback program, according to an exemplary embodiment of the present invention.

FIG. 2 is a block diagram illustrating the configuration of an apparatus for processing moving image ancillary information based on a script according to an embodiment of the present invention, and FIG. 3 is a view illustrating the configuration of an ancillary information script applied to an apparatus for processing moving image ancillary information according to an embodiment of the present invention. FIG. 4 is an exemplary view illustrating an ancillary information script output screen in an apparatus for processing moving image ancillary information according to an embodiment of the present invention, and FIG. 5 is an exemplary view illustrating an ancillary information script input screen in an apparatus for processing moving image ancillary information according to an embodiment of the present invention. FIG. 6 is a view illustrating an example of an ancillary information script applied to an apparatus for processing moving image ancillary information according to an embodiment of the present invention, and FIG. 7 is a view illustrating an example of applying an apparatus for processing moving image ancillary information according to the present invention to a general moving image playback program.

As illustrated in FIGS. 2 to 7, an apparatus for processing moving image ancillary information based on a script, according to an exemplary embodiment of the present invention, includes an input unit 10, a storage unit 20, an extraction unit 30, and an output unit 40.

The input unit 10 receives a command from a user for inputting ancillary information including the script to a moving image being played.

The ancillary information may be expressed as a script, or may be constructed directly by the user.

The ancillary information, as illustrated in FIG. 3, includes text and image information, moving ID information, and time information.

The text information includes a display position, a time duration, and text content.

The image information may be expressed as a picture or a drawing having a vector value.

The moving image ID information expresses connection information between the ancillary information and the moving image, and an ID assigned to a moving image or hash information is generally used as the moving image ID information.

The time information expresses time information for which the ancillary information is displayed.

The main configuration of the script ancillary information as described above may be expressed in the user script as illustrated in FIG. 6. Specifically, information on the drawing to be used may be predefined through a style element. Then, a start time is defined through a start attribute of a sync element, and a time duration is defined through a duration attribute. P element is directly defined or is defined by using drawing information defined through the style element. The information can be displayed using background, width, height, alpha values. As illustrated in FIG. 4, the information as expressed above is outputted as the moving image is played, and provides the compatibility with the existing caption file, so that the information can be used in the existing application program as illustrated in FIG. 7.

The storage unit 20 stores the ancillary information input to the input unit 10. That is, the storage unit 20 stores text and image information, moving image ID information, time information, and so forth, in a database.

The extraction unit 30 searches and extracts the ancillary information stored in the storage unit during playback of the moving image.

The output unit 40 outputs the ancillary information extracted by the extraction unit 30 to a corresponding image display screen using the script.

Hereinafter, with reference to FIGS. 8 and 9, a method of processing moving image ancillary information based on a script according to an exemplary embodiment of the present invention will be described.

Figure 8:
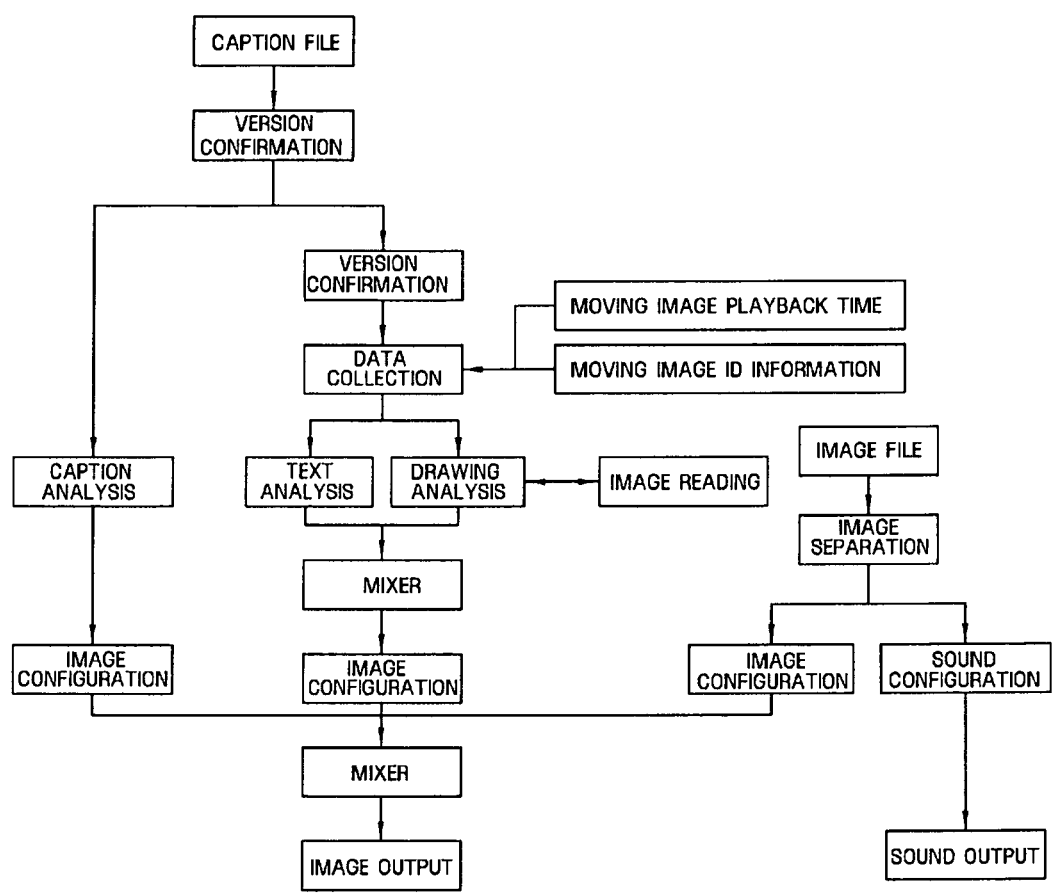
FIG. 8 is a view illustrating the processing of moving image ancillary information bases on script according to an exemplary embodiment of the present invention.
Figure 9:
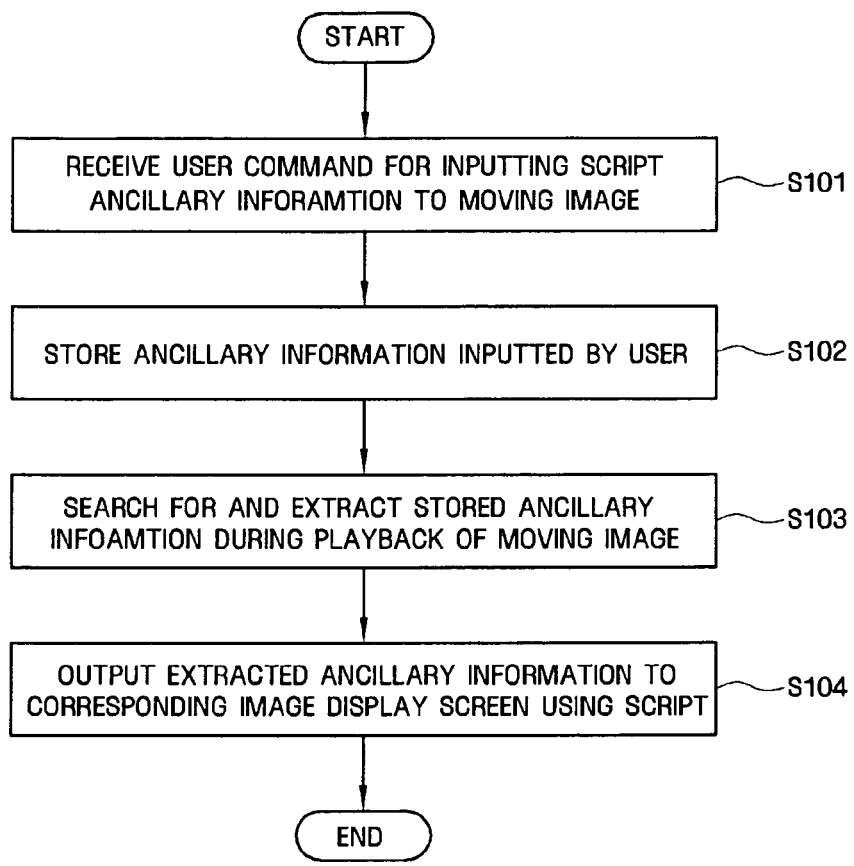
FIG. 9 is a flowchart illustrating a method of processing moving image ancillary information based on script according to an exemplary embodiment of the present invention.

As illustrated in FIGS. 8 and 9, a user inputs a command for inputting ancillary information including the script at a time point when a moving image is played or is paused (S101). An application program displays the ancillary information as a script image expressed by a picture or a drawing having a vector value, and the user arranges the script image in a desired position of the corresponding image display screen, and inputs text.

The ancillary information input by the user is stored (S102). At a storage operation, compulsory data may include text and image information, moving image ID information, time information, and so forth. However, for user identification, user ID information such as the "userid" attribute of FIG. 6 may be added. The user identification may comprise an email address or other information that can be identified in the system, or other appropriate information. The ancillary information as constructed above may be expressed as shown in FIG. 4, and the expressed caption file may be used as the caption in a general moving image player as shown in FIG. 7.

In order to display the ancillary information stored in the storage unit on the image display screen, the ancillary information is searched and extracted during playback of the moving image (S103). By using moving image ID information and time information for which the ancillary information is displayed, the corresponding ancillary information is searched for and extracted.

The extracted ancillary information is output to the corresponding image display screen using the script (S104). Specifically, the image of the ancillary information is expressed as a picture or a drawing having a vector value, and the text of the ancillary information is converted into an image to be expressed. The picture or the drawing image is synthesized with the text image, and the synthesized image is displayed on the corresponding image display screen, so that the user can view the synthesized image.

In addition, the ancillary information includes duration information, and is displayed on the screen for the corresponding time. Accordingly, by adjusting the moving image playback time position, the past ancillary information can be viewed again.

By selecting a specified user through the use of the user information in the script, the ancillary information can be displayed. Accordingly, if a viewer desires to view the ancillary information of the specified user, the ancillary information can be displayed through the identification and selection of the user in the ancillary information.

In addition, the user can add ancillary information by correcting the script.

As described above, according to an apparatus for processing moving image ancillary information based on a script and a method thereof according to exemplary embodiments of the present invention, since a user can generate and display ancillary information on a moving image being displayed based on the script, the user's opinion and various ancillary information related to the moving image can be easily and efficiently input and displayed.

In addition, by displaying a caption in the form of a balloon help based on the technology as described above, the caption information can be more conveniently generated and provided to the user, and can be edited by using a simple image or text on the moving image such as a TV entertainment program display screen.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An apparatus for processing moving image ancillary information based on a script, the apparatus comprising:
   an input unit which receives a user command for inputting ancillary information corresponding to at least one image display screen of the moving image, the ancillary information comprising content information and information regarding one or more specified characteristics of the content information;
   a storage unit which stores the ancillary information input to the input unit;
   an extraction unit which searches for and extracts the ancillary information stored in the storage unit during playback of the moving image; and
   an output unit which outputs the ancillary information extracted by the extraction unit to a corresponding image display screen based on the one or more specified characteristics,
   wherein the ancillary information further comprises text and image information, information for a display position of the text and image information on each image display screen, and time duration of the text and image information.

2. The apparatus of claim 1, wherein the image information comprises a picture or a drawing having a vector value.

3. The apparatus of claim 1, wherein the ancillary information further comprises moving image identification information.

4. The apparatus of claim 1, wherein the one or more specified characteristics comprises moving image playback time information.

5. The apparatus of claim 1, wherein the ancillary information further comprises user identification information.

6. The apparatus of claim 5, wherein the user identification information comprises a user's e-mail address.

7. The apparatus of claim 1, wherein the content information comprises a caption applicable to a moving image.

8. A method of processing moving image ancillary information based on a script, the method comprising:
   receiving a user command for inputting ancillary information corresponding to at least one image display screen of the moving image, the ancillary information comprising content information and information regarding one or more specified characteristics of the content information;
   storing the ancillary information;
   searching for and extracting the stored ancillary information during playback of the moving image; and
   outputting the extracted ancillary information to a corresponding image display screen based on the one or more specified characteristics,
   wherein the ancillary information further comprises text and image information, information for a display position of the text and image information on each image display screen, and time duration of the text and image information.

9. The method of claim 8, wherein the ancillary information further comprises user identification information.

10. The method of claim 8, wherein the image information of the ancillary information comprises a picture or a drawing having a vector value.

11. The method of claim 8, wherein searching for and extracting the stored ancillary information comprises searching for and extracting the ancillary information by using moving image identification information and time information.

12. The method of claim 8, wherein the image information of the ancillary information comprises a picture of a drawing having a vector value; and
   wherein outputting the extracted ancillary information comprises:
   converting text of the ancillary information into an image and expressing the text of the ancillary information as the image;
   synthesizing the picture or drawing image with the text image; and
   outputting the synthesized image on the image display screen.

13. The method of claim 8, wherein outputting the extracted ancillary information comprises displaying the ancillary information for a determined time based on the one or more specified characteristics.

14. The method of claim 8, wherein outputting the extracted ancillary information comprises selecting a specified user based on user information in the script and displaying the ancillary information.

* * * * *